United States Patent [19]

Klein

[11] Patent Number: 4,848,848
[45] Date of Patent: Jul. 18, 1989

[54] BRAKE SLIP-CONTROLLED DUAL CIRCUIT VEHICLE BRAKE SYSTEM

[75] Inventor: Han-Christof Klein, Hattersheim, Fed. Rep. of Germany

[73] Assignee: Alfred Teves GmbH, Frankfurt am Main, Fed. Rep. of Germany

[21] Appl. No.: 121,489

[22] Filed: Nov. 17, 1987

[30] Foreign Application Priority Data

Nov. 27, 1986 [DE] Fed. Rep. of Germany ....... 3640453

[51] Int. Cl.⁴ .............................................. B60T 8/32
[52] U.S. Cl. ..................................... 303/115; 303/56; 303/114; 60/563; 60/581
[58] Field of Search ............... 303/113, 114, 15, 4, 303/31, 15, 56, 52; 60/562, 581; 188/356, 182

[56] References Cited

U.S. PATENT DOCUMENTS

| | | | |
|---|---|---|---|
| Re. 28,890 | 7/1976 | Ingram et al. | 303/10 |
| 3,577,970 | 6/1970 | Cripe | 303/4 |
| 4,026,109 | 5/1977 | Fay | 60/581 |
| 4,143,514 | 3/1979 | Leiber | 60/581 X |
| 4,375,304 | 3/1983 | Schopper et al. | 303/56 X |
| 4,578,951 | 4/1986 | Belart et al. | 60/581 X |
| 4,682,824 | 7/1987 | Burgdorf et al. | 60/563 X |
| 4,708,401 | 11/1987 | Klein | 188/356 |

FOREIGN PATENT DOCUMENTS

| | | |
|---|---|---|
| 2202998 | 7/1973 | Fed. Rep. of Germany . |
| 2127535 | 7/1976 | Fed. Rep. of Germany . |
| 2811005 | 10/1978 | Fed. Rep. of Germany . |
| 2610579 | 4/1979 | Fed. Rep. of Germany . |
| 2824482 | 12/1979 | Fed. Rep. of Germany . |
| 3030621 | 3/1981 | Fed. Rep. of Germany . |
| 3213007 | 10/1983 | Fed. Rep. of Germany . |

*Primary Examiner*—Andres Kashnikow
*Assistant Examiner*—Matthew C. Graham
*Attorney, Agent, or Firm*—James B. Raden

[57] ABSTRACT

A vehicle brake system comprises two pressure modulators (16, 18) one of which (16) is associated with one of the brake circuits (12) and the other of which (18) is associated with the other (14) of the brake circuits. The modulators (16, 18) are accommodated in a housing, preferably in the form of a twin arrangement, and are actuated by means of a common drive unit. The pressure modulators (16, 18) each include a plunger piston (78) which is acted on by a differential gear in the common drive unit. In a first embodiment, a vacuum servo drive (20) serves as the drive unit and the differential gear comprises a linear guiding element (106) and an angular lever (112) articulated thereto. The force required to hold down the plunger pistons (78) in their initial position can be applied mainly pneumatically. A ventilatable chamber (M2) of the vacuum servo drive (20) being connected for that purpose with the ventilatable working chamber (B2) of a vacuum brake power booster (32). In another embodiment, the drive unit comprises an electric motor (140) which acts upon plunger piston drives (130) via a differential gear train (132).

6 Claims, 7 Drawing Sheets

BRAKE SLIP-CONTROLLED DUAL CIRCUIT VEHICLE BRAKE SYSTEM

BACKGROUND OF THE INVENTION

The present invention relates to a brake slip-controlled dual circuit vehicle brake system. More particularly, this invention relates to such a system wherein: The brake pedal force is transmitted to a master cylinder and from the latter onto the wheel brake cylinders via a plurality of independently blockable pressure fluid conduits; two pressure modulators are associated with one of the brake circuits respectively; and sensors are associated with the wheels for the detection of a wheel lock tendency as well as for the generation of control signals. With this system the brake pressure at the wheels can be influenced either individually or in groups using the pressure modulators.

A vehicle brake system of this type is disclosed in my co-pending U.S. Application Ser. No. 944,242 filed Dec. 18, 1986. This application corresponds to my German application DE No. 35 45 236 published on June 25, 1987. In the system there disclosed, the pressure modulators are separate assemblies, each of them having its own pneumatic servo drive. They are relatively expensive assemblies and do not ensure that a uniform controlled pressure prevails in both brake circuits when the brake slip control is operative. An equal distribution of the brake force is, of course, highly desirable.

SUMMARY OF THE INVENTION

It is among the objects of the present invention to provide a vehicle brake system of the type initially referred to which is relatively inexpensive with regard to assemblies and controls, which ensures a uniform controlled pressure in both brake circuits when the brake slip control sets in, and which is characterized by a compact design of the pressure modulators.

In order to achieve these objects it is proposed that the pressure modulators be accommodated in a housing in the form of a multiple arrangement, in particular a tandem or twin arrangement of the associated hydraulic cylinders, and that they be actuatable by means of a common drive unit.

The twin arrangement provides essential advantages with regard to a compact design. A very simple design of the hydraulic cylinders and of a valve unit serving control purposes is thus possible. The hydraulic cylinders are actuated by means of a single drive unit, bringing about considerable design simplifications as compared to the use of separate drive units for both pressure modulators. In addition, it is easily possible to distribute the force of the drive unit onto both hydraulic cylinders so as to achieve a uniform control pressure.

In particular, the pressure modulators can be provided with one hydraulic slave cylinder each which has a connection leading to the master cylinder and a connection leading to at least one wheel brake cylinder. Between the connections, a valve is preferably arranged which is actuatable by means of a plunger piston which is arranged in the slave cylinder and which is controlled through the intermediary of the drive unit. Before the brake slip control sets in, this valve is preferably held in the open position by means of the plunger piston, the drive unit then exerting an actuating force upon the plunger piston which exceeds the hydraulic force acting upon the latter. When the brake slip control sets in, the actuating force is reduced whereupon the valve closes and the slave cylinder takes over a certain volume of hydraulic fluid from at least one wheel brake cylinder by means of a corresponding stroke of the plunger piston, which stroke is controlled through the intermediary of the drive unit, with the purpose of reducing the brake force. This arrangement influences the brake force to a wide extent and at short intervals by means of a corresponding control of the plunger pistons.

A multiplex operation can be provided wherein a plurality of, in particular two, wheel brake cylinders are connected alternately with the slave cylinder of a pressure modulator. By this means, one single pressure modulator is sufficient for two or corresponding plurality of brake cylinders. On the other hand, the provision of one pressure modulator each per brake circuit of a dual circuit vehicle brake system ensures a high degree of operational reliability.

The drive unit can act upon the plunger pistons through the intermediary of a differential gear. Such a differential gear provides a simple means for distributing the force of the drive unit upon the plunger pistons in a well-defined manner and ensures a uniform control pressure in both brake circuits, in particular when the brake slip control is operative.

A differential gear which is particularly suitable for a twin arrangement of slave cylinders comprises an angular lever with a driven linear guiding element which is articulated at the latter. Each end of the lever bears against the end face of the two plunger pistons. The angular lever can be designed such that the maximum permissible relative movement of the plunger pistons against each other equals the full plunger piston stroke. The ends of the angular lever are preferably provided with a roll-off curve so that in all angular positions of the lever, the contact between the roll-off curve and the plunger pistons is made in the lever's axial center and with a tangent which is directed transversely to the axial direction. The lever thus acts upon both plunger pistons with the same lever arm, irrespective of the lever's angular position. Therefore, the controlled pressure is also identical in both slave cylinders, irrespective of the angular position of the lever. Thus, with a compact design, the pressure ratios correspond to those of a tandem arrangement of slave cylinders.

Due to the shape of the roll-off curves, transverse forces acting upon the plunger pistons are limited to the frictional forces on the contact level. These frictional forces are already small on plunger piston ends which are shaped in the form of flat tappets. They can be reduced even further by shaping the ends of the plunger pistons in the form of roller tappets, the rollers coming into contact with the respective roll-off curve. The transverse forces onto the plunger pistons then are extremely small and can be easily taken up by means of conventional piston guiding elements.

For the pressure modulators, an electro-mechanical drive unit is envisaged. In particular, the linear guiding element at which the angular lever is articulated is capable of being actuated by means of a ball spindle friction coupling mechanism. In a preferred embodiment, however, a vacuum servo drive is envisaged as a drive unit of the pressure modulators. The vacuum servo drive unit comprises two chambers which are separated from each other by means of a movable wall which is connected with the linear guiding element in a suitable manner. A vacuum is permanently prevailing in one chamber, whereas the other chamber can be evacuated and air which is under controllable pressure can be applied to the latter so as to generate an actuating force acting in opposite direction to the hydraulic force at the plunger piston. Such a vacuum servo drive can be advantageously combined with existing vacuum systems of the vehicle, in particular with a vacuum brake power booster.

The servo drive can be provided with a spring which bears against the movable wall and which acts in a direction opposite to the hydraulic force at the plunger pistons. Said spring can be in the form of a safety spring such that it maintains the plunger pistons in the initial position before the brake slip control sets in, even at the maximum permissible hydraulic pressure. It is thus ensured that the valve arranged in the slave cylinder will not close and will not separate the master cylinder from the connected wheel brake cylinder.

Such a mechanical safety spring may be considered too bulky and heavy. Alternatively, it is therefore proposed to design a weak spring and to generate a pneumatic actuating force by means of air injection into the ventilatable chamber of the servo drive, that is, the chamber that can be inactuated and receive control air. Before the brake slip control sets in, the sum of pneumatic actuating force and the weaker spring actuating force must then clearly exceed the hydraulic force at the plunger piston.

It is, for instance, possible to connect the ventilatable chamber of the servo drive with the atmosphere via a controlled valve and to use only the ambient air being under atmospheric pressure in order to apply the pneumatic actuating force upon the plunger pistons. The corresponding pressure differential at the movable wall of the servo drive is easily sufficient to maintain the plunger piston in its initial position. It may be less advantageous that the ventilatable chamber of the servo drive must be evacuated — starting from full atmospheric pressure — when the brake slip control sets in, because this brings about a certain delay in the response of the control system.

In fact, at a low hydraulic pressure in the brake circuits, a considerably lower air pressure is sufficient in the ventilatable chamber of the servo drive in order to apply the required pneumatic hold-down force upon the plunger pistons. Suitably pressurized air may be available in a possibly provided vacuum brake power booster of the master cylinder. Such a vacuum brake power booster is normally equipped with two working chambers separated from each other by means of a movable wall, one of said working chambers being permanently under a vacuum whereas the other one being evacuatable and air which is under controllable pressure being applicable to the latter when the brake pedal is actuated. According to the invention it is now proposed to connect the ventilatable chamber of the servo drive with the latter working chamber of the brake power booster. By means of a respective design of the servo drive it can be ensured that the pneumatic actuating force applied is sufficient in order to maintain the plunger piston in its initial position before the brake slip control sets in. On the other hand, however, a vacuum normally exists in the ventilatable chamber of the servo drive, thus permitting a quick evacuation of the chamber when the brake slip control is to set in.

It should be noted that even in the event of a connection of the servo drive to a vacuum brake power booster, a controlled connection of the ventilatable chamber of the servo drive toward the atmosphere is useful in order to guarantee in each case a return to the initial inoperative position. In the event of an abrupt interruption of the braking process by releasing the brake pedal when the brake slip control is operating, the pressure is reduced in the ventilatable working chamber of the vacuum brake power booster, and a specific air pressure must be maintained and/or generated upon separation of the servo drive and the vacuum brake power booster by ventilating the ventilatable chamber of the servo drive. Considering all other aforementioned advantages, the control operations connected therewith are justifiable.

Since, for safety reasons, one must proceed on the assumption that one of the chambers of the servo drive is permanently connected with a vacuum source and that in the other chamber, only the corresponding vacuum pressure will be achievable, equipment must be available in order to overcome the spring actuating force acting upon the plunger pistons if the hydraulic pressure is to be reduced to zero by means of the brake slip control. For that purpose, the servo drive is preferably provided with another movable wall which is connected with the linear guiding element. Thus another movable wall closes the vacuum chamber, is adjacent to the atmosphere, is dimensioned such that the force acting onto it compensates the spring actuating force substantially.

The weak spring alone is unable to generate the actuating force required to maintain the plunger pistons in their initial position. Therefore, a vacuum pressure in the vacuum chamber of the servo drive is required in each case. As a safety device, a brake which is released when a vacuum exists and becomes operative in the event of a vacuum drop is provided in the preferred embodiment of the invention. This brake locks the linear guiding element and thus maintains the plunger pistons in their initial position in the event of a failure of the vacuum supply.

In another embodiment of the present invention, an electric motor is used as drive unit for pressure modulators instead of a pneumatic drive. In this case, a differential gear is preferably interposed as the compensating gear between two plunger piston drives. For example, the differential gear can be in the form of ball spindle drives.

BRIEF DESCRIPTION OF THE DRAWING

The present invention will be described in more detail in the following by means of design examples illustrated in the accompanying drawings.

DETAILED DESCRIPTION OF A PREFERRED EMBODIMENT

Figure 1:
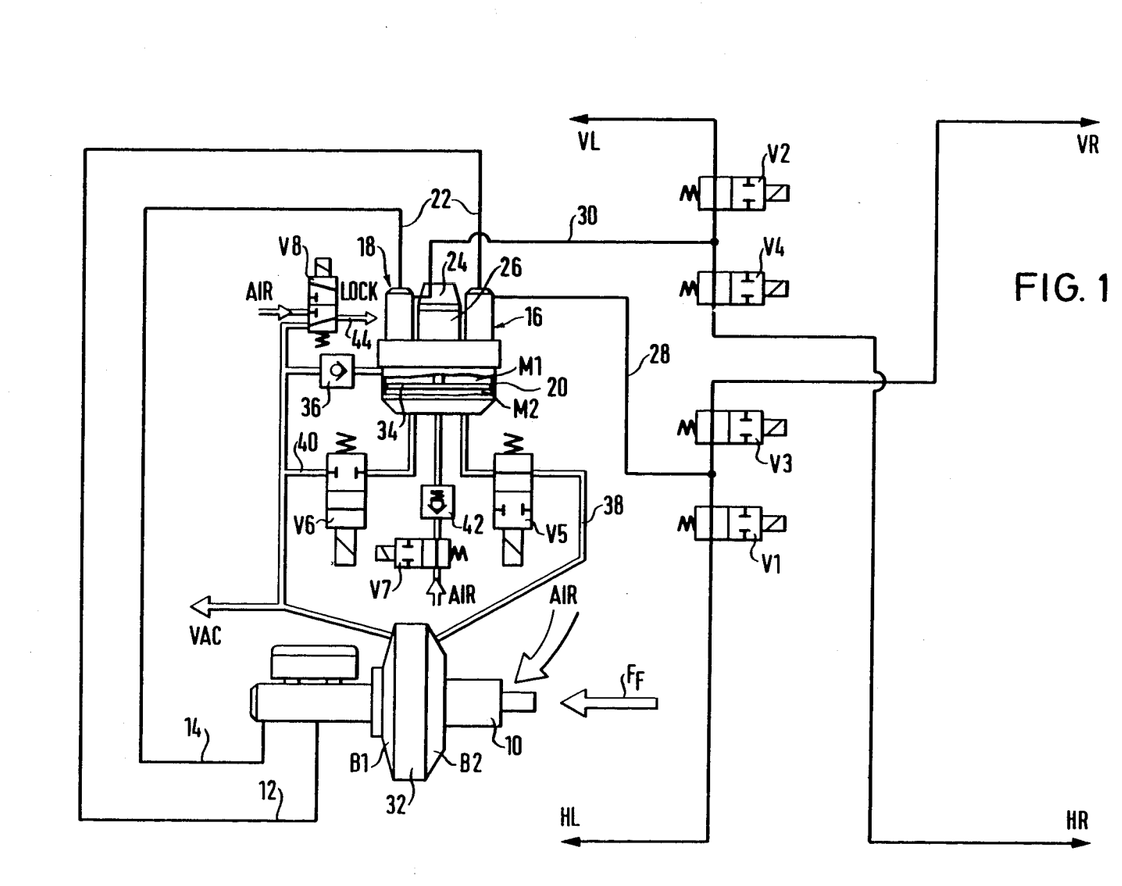
FIG. 1 is a schematic diagram of a brake slip-controlled dual circuit vehicle brake system with two pressure modulators having a twin arrangement in accordance with this invention.

FIG. 1 shows the total connection diagram of a brake slip-controlled dual circuit brake system in accordance with this invention. From a tandem brake master cylinder 10, there are two brake circuits 12, 14 leading to wheel brake cylinders VL, VR, HL, HR which cylinders are not illustrated in detail. In a normal diagonal brake circuit split, the brake circuit 12 supplies, for instance, the brake cylinders VR at the righthand front wheel and HL at the lefthand rear wheel, whereas the brake circuit 14 supplies the wheel brake cylinders VL at the lefthand front wheel and HR at the righthand rear wheel.

A pressure modulator 16, 18 is interposed in each brake circuit 12, 14, respectively. The pressure modulators 16, 18 are accommodated in a common housing and are associated with hydraulic slave cylinders having a twin arrangement. Both pressure modulators are actuated by means of a vacuum servo drive 20 in order to reduce the brake pressure at the wheel brake cylinders VL, VR, HL, HR in a controlled fashion if a wheel lock tendency occurs.

The vehicle brake system also includes sensors which are not illustrated as they are well known in the art. The sensors detect a locking tendency of each individual wheel and transmit control signals to an electronic control unit 24 which together with a hydraulic valve cluster 26, is mounted to the vacuum servo drive 20 between the slave cylinders of the pressure modulators. The control unit 24 controls electromagnetically actuated valves V1 to V8 so as to obtain the desired hydraulic pressure control at the wheel brake cylinders VL, VR, HL, HR. Details of the electronic control are known in the art and are not described herein as they are not necessary for an understanding of this invention.

Each of the pressure modulators 16, 18 is equipped with a connection 22 associated with the brake circuit 12 and/or 14 and leading to the brake master cylinder 10. The connections 22 are arranged on the end face of the slave cylinders. A line 28, 30 is associated with the respective brake circuit 12 and 14 and leads from the circumference of the slave cylinders and branches to the two wheel brake cylinders of the brake circuit. Flow from the branches is governed by a fast-operating two-way/two-position valve V1, V3 and/or V2, V4 each, which open and close independently of each other. The wheel brake cylinders VL, VR and/or HL, HR associated with one front wheel and/or rear wheel each of a specific brake circuit 12, 14 can thus be connected in a multiplex operation to the slave cylinder of the associated pressure modulator 16, 18.

The tandem master cylinder 10 is actuated with a pedal force $F_F$. It is combined with a vacuum brake power booster 32 boosting the pedal force in order to achieve a pressure increase in the brake circuits 12, 14.

The vacuum brake power booster 32 is conventional and is provided with two working chambers B1, B2 separated from each other by means of a movable wall. One of the working chambers, B1, is permanently connected with a vacuum source VAC. When the brake pedal is in the inoperative position, the other working chamber B2 is also evacuated. As soon as the pedal actuation starts, said working chamber is separated from the vacuum source VAC and air is applied to it, the air pressure increasing in a controlled manner as the actuating force $F_F$ increases. Thus a pneumatic force acts upon the elastic wall of the vacuum brake power booster 32 and boosts the pedal force $F_F$.

The vacuum servo drive 20 of the pressure modulators 16, 18 having a twin arrangement is also provided with a movable wall 34 separating two chambers M1, M2 from each other in the common housing of the pressure modulators 16, 18. The movable wall 34 exerts a force upon the plunger pistons in the slave cylinders of the pressure modulators 16, 18 via a differential gear in a manner which will be described in more detail later on. The chamber M1 of the servo drive 20 is permanently connected with the vacuum source VAC via a non-return valve 36. The other chamber M2 communicates with the ventilatable chamber B2 of the vacuum brake power booster 32 via a line 38. In the line 38, an electrically controlled two-way/two-position valve V5 is arranged which, alternatively, either switches open or closed. The chamber M2 can thus be pressurized with the working pressure prevailing in the ventilatable working chamber B2 of the vacuum brake power booster 32 in a controlled manner. Another line 40 with an electrically controlled two-way/two-position valve V6 function leads from the chamber M2 to the vacuum source VAC. The chamber M2 can thus be evacuated via the valve V6 in a controlled manner. Finally, a third connection of the chamber M2 is provided and it leads to the atmosphere via a non-return valve 42 and an electrically controlled two-way/two-position valve V7. The latter is an auxiliary valve through the intermediary of which the chamber M2 can be ventilated in a controlled manner.

The pressure modulators 16, 18 are associated with a brake LOCK which is released when a vacuum is prevailing and which is applied when the vacuum drops. A connection 44 leading to said brake can be connected via the two-way/two-position valve V8 either with the vacuum source VAC or with the atmosphere.

Figure 2:
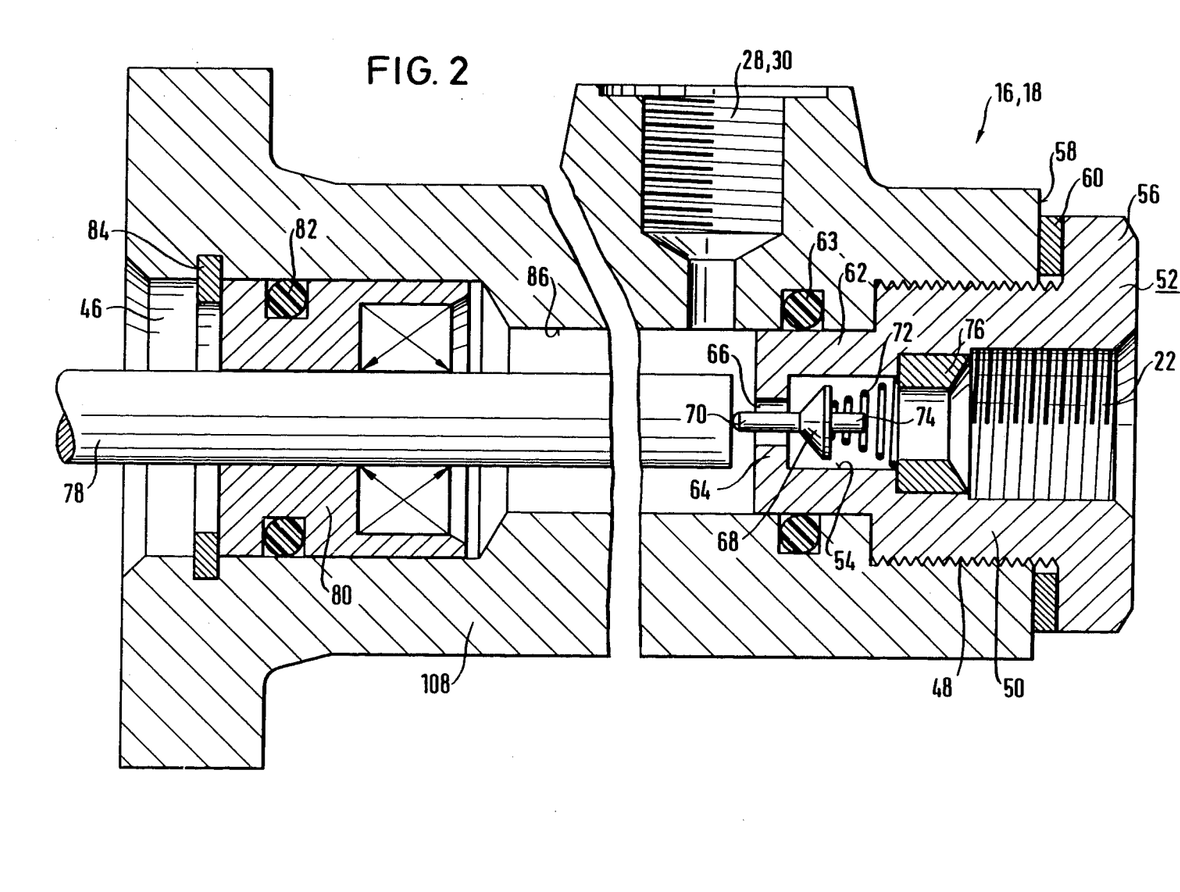
FIG. 2 is a sectional view of the slave cylinder of one of the pressure modulators.

FIG. 2 shows a slave cylinder with a plunger piston which slave cylinder is provided in both pressure modulators 16, 18. The slave cylinder has a multiple stepped cylinder bore 46. At the end face of the slave cylinder where the connection 22 branches off toward the master cylinder 10, a larger-diameter area of the cylinder bore 46 is shaped as a threaded bore 48 into which a valve insert 52 with a threaded portion 50 is screwed. The valve insert 52 is provided with a central stepped axial bore 54 for the connection 22 and this bore 54 contains a tappet valve including a valve member 68 for controlling the connnection 22.

A flange 56 with an even greater diameter is formed at one end of the threaded portion 50 of the valve insert 52 and is located in front of the end face 58 of the slave cylinder when assembled. A washer 60 is clamped between the end face 58 and the flange 56, the washer's thickness being used as a simple means for tolerance tuning. Adjacent to the threaded portion 50, towards the interior of the slave cylinder, there is provided a smaller-diameter portion of the valve insert 52 which meshes fittingly with a smaller-diameter section of the cylinder bore 46 and is here sealed by means of an o-ring 63 inserted in a circumferential annular groove of the slave cylinder. The smaller-diameter section 62 is confined at the end face by means of a bottom wall 64 which is provided with a central port 66 that is closable by means of the conical valve member 68. A valve tappet 70 is formed on the valve member 68 and protrudes with a clearance through the port 66 and juts beyond the bottom wall 64. The valve member 68 is pre-loaded in the direction of closure by means of a valve spring 72, one end of which bears against the base of the valve member 68. The spring 72 is centered by means of a pin 74. The other end of the valve spring 72 abuts against a bearing ring 76 fitted in the axial bore 54.

Downstream of the tappet valve, the cylinder bore 46 receives a plunger piston 78. The latter is axially displaceably accommodated in a combined sealing-guiding-package 80 which is installed, from the other side, in enlarged portion of the cylinder bore 46, is sealed by means of an o-ring 82 and is secured by means of a retaining ring 84. Before the brake slip control sets in, the piston 78 assumes an initial position in which it abuts against the valve tappet 70 with its end face and thus maintains the tappet valve in its open position in opposition to the force of the valve spring 72. Therefore, there is a passage between the connection 22 and a portion 86 of the cylinder bore 46, which portion has a distinctly larger diameter than the plunger piston 78 and serves as a plunger cylinder. The wall of the plunger cylinder 86 can remain unworked. Branching off the plunger cylinder is the above-mentioned radial connection 28, 30 leading to the wheel cylinder brakes.

During normal braking without brake slip control the tappet valve remains open. The hydraulic pressure in the plunger cylinder 86 increases, and a hydraulic force $F_p$ is applied onto the end face of the plunger piston 78. This hydraulic force must be overcompensated by means of an actuating force acting in opposite direction so that the plunger piston 78 maintains its initial position and the tappet valve remains open.

When the brake slip control sets in, this actuating force is reduced. The plunger piston 78 then moves back, the tappet valve closes and the plunger cylinder 86 takes up hydraulic fluid from the connected wheel brake cylinders which, as has been mentioned above, can be effected in a multiplex operation. During the following control operation, the hydraulic pressure at the wheel brake cylinders and thus the brake force is dependent on the position of the plunger piston 78 and the actuating force applied onto it.

Figure 3:
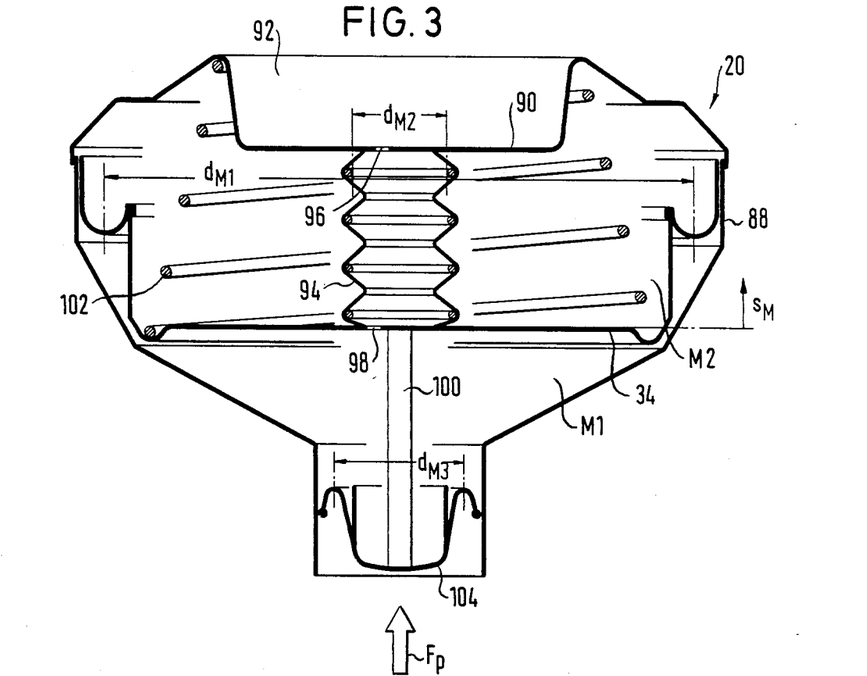
FIG. 3 is the diagrammatic sectional view of a vacuum servo drive of the pressure modulators.

FIG. 3 is a detailed illustration of the vacuum servo drive 20 generating the force acting upon the two plunger pistons 78 of the pressure modulators 16, 18 having a twin arrangement. The servo drive 20 comprises a housing 88 which has, an inwardly drawn rigid bottom 90 formed along its back wall to provide an indentation 92. Into the housing indentation 92, the valve cluster 26 is sealingly accommodated. The housing 88 is subdivided by means of the movable wall 34 into the two chambers M1, M2, the ventilatable chamber M2 being arranged adjacent the bottom wall 90 and the chamber M1 permanently connected with the vacuum source being arranged on the side directed away from the bottom wall. A vacuum connection leads to said chamber M1 through the intermediary of a pleated bellows 94 arranged centrally and axially in the housing 88, said pleated bellows comprising connection ports 96, 98 in the bottom 90 and the movable wall 34, respectively. An electric connection of the valves V5 to V8, actuating the servo drive, with the electronic control unit 24 is also established through the intermediary of the pleated bellows 94, said control unit being mounted to the valve cluster 26. The movable wall 34 has a diameter of $d_{M1}$ and the pleated bellows 94 a diameter $d_{M2}$. If a differential pressure is applied onto the chambers M1, M2, the corresponding differential area $A_{M1} - A_{M2}$ is, therefore, available as effective area of the movable wall.

The force is transmitted from the servo drive 20 by means of a rod 100 which is accommodated centrally and axially in the housing 88 and which is directed away from the bottom 90. As will be described hereinafter with reference to FIG. 7, the rod 100 is connected with a linear guiding element at which an angular lever is articulated for regulating the distribution of the actuating force onto the plunger pistons. Without going into details at this point, it should be apparent that by introducing air into the chamber M2, an actuating force can be generated at the rod 100, which force is acting in opposite direction to the hydraulic force $F_p$ acting on the plunger pistons 78 and is thus able to maintain the plunger pistons 78 in their initial position.

The servo drive 20 also includes a spring 102 which bears, on the one hand, against the bottom wall 90 around the housing indentation 92, and, on the other hand, radially outwardly against the movable wall 34. This spring is a compression spring whose elastic force $F_S$ intensifies the actuating force acting upon the plunger piston in opposite direction to the hydraulic force $F_p$. For space and weight reasons, the spring 102 has such a weak design that, on its own, it would not be in a position to maintain the plunger pistons in their initial position at the maximum permissible hydraulic pressure prior to the start of the brake slip control. The actuating force required for that purpose is generated predominantly by an application of air onto the chamber M2.

Figure 5:
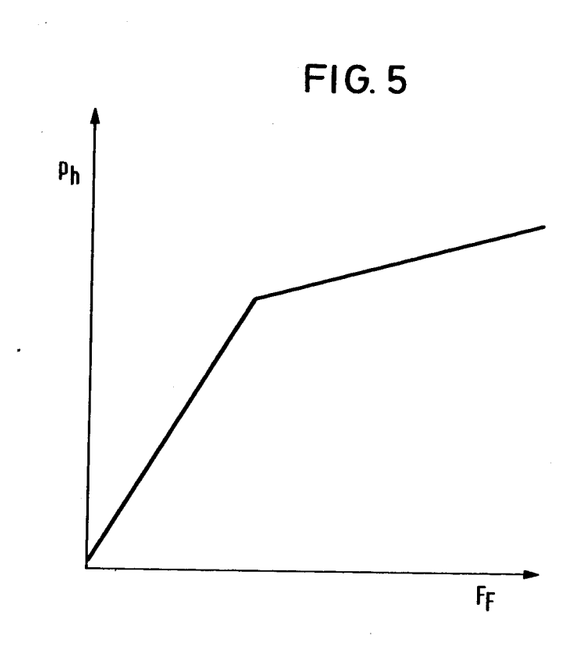
FIG. 5 is a pressure characteristic curve of a vacuum brake power booster connected with the vacuum servo drive and plots the pressure as a function of the applied pedal force.
Figure 6:
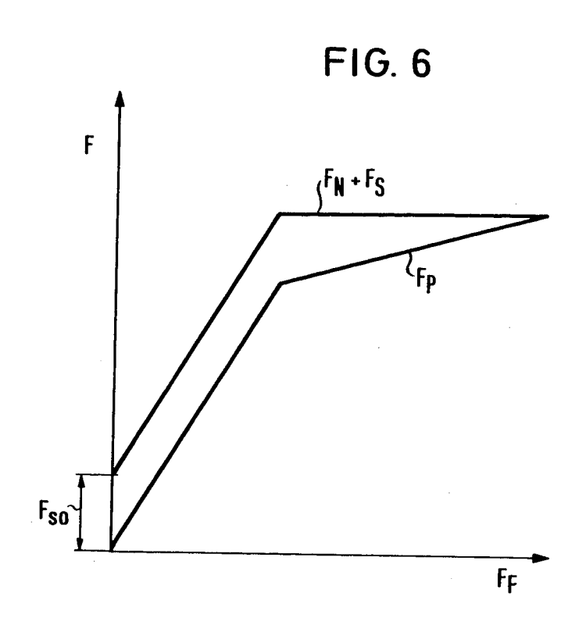
FIG. 6 is a characteristic curve of the hydraulic force acting upon the plunger pistons and of the hold-down force acting in opposite direction to the latter, as a function of the pedal force.

As described with respect to of FIG. 1, the chamber M2 is connected with the ventilatable working chamber B2 of the vacuum brake power booster 32. Before the brakes are operated, a vacuum prevails in both working chambers B1, B2 of the brake power booster 32, and this applies also to the chambers M1, M2 of the servo drive 20. Due to the effect of the spring 102, the movable wall 34 of the servo drive then assumes the initial position shown in FIG. 3 which has a maximum distance to the bottom wall 90. If the brake pedal is now actuated and a force $F_F$ is applied onto the brake power booster 32, a ventilation of the working chamber B2 is effected and the hydraulic pressure $p_h$ in the brake circuits 12, 14 is increased. FIG. 5 shows a typical characteristic curve. The hydraulic force $F_p$ acting upon the plunger pistons 78 is thus increased as well. However, the working chamber B2 of the vacuum brake power booster 32 and the chamber M2 of the servo drive 20 are simultaneously applied with air. With a corresponding design of the servo drive 20 the pneumatic actuating force resulting therefrom at the movable wall 34 in cooperation with the elastic force $F_S$, exceeds the hydraulic force $F_p$ at the plunger pistons 78 as is illustrated in FIG. 6. The plunger pistons 78 then remain in their initial position until the brake slip control sets in. The latter is effected when brake slip control sets in, movement of the plunger pistons 78 by closing of the valve V5 and opening of the valve V6 so that the chamber M2 is connected with the vacuum source VAC. Thus, the pneumatic actuating force is reduced and the plunger pistons 78 can start to move.

From the above description it becomes apparent that the servo drive 20 is unable to generate a hydraulic pressure "zero" at the wheel brake cylinders when the brake slip control is in operation. Since the chamber M1 is permanently connected with the vacuum source, and since at most the same vacuum pressure can be achieved in the chamber M2, the elastic force $F_S$ bears in any case on the plunger pistons — even under conditions of pressure equilibrium — which results in a residual pressure at the wheel brake cylinders. However, for design reasons, the elastic force $F_S$ cannot be reduced at will.

In order to overcome this disadvantage, the rod 100 serving to transmit the force from the servo drive 20 is, as shown in FIG. 3, connected with another movable wall 104 which is arranged on that side of the servo drive 20 which is located away from the bottom wall 90. This wall 104 confines the chamber M1, which is permanently under a vacuum, toward the atmosphere. The movable wall 104 has a diameter $d_{M3}$ and a corresponding effective area $A_{M3}$. The atmospheric pressure applied onto this area leads to a force at the rod 100, which force is acting in the same direction as the hydraulic force $F_p$ but is acting in opposite direction to the elastic force $F_S$. By means of an appropriate dimensioning of the movable wall 104, it is possible to compensate for the elastic force $F_S$ almost completely and to generate a brake pressure in the wheel brake cylinders upon the start of the brake slip control, when a pressure equilibrium exists in the chambers M1, M2, which has the same effect as a brake pressure "zero".

Figure 4:
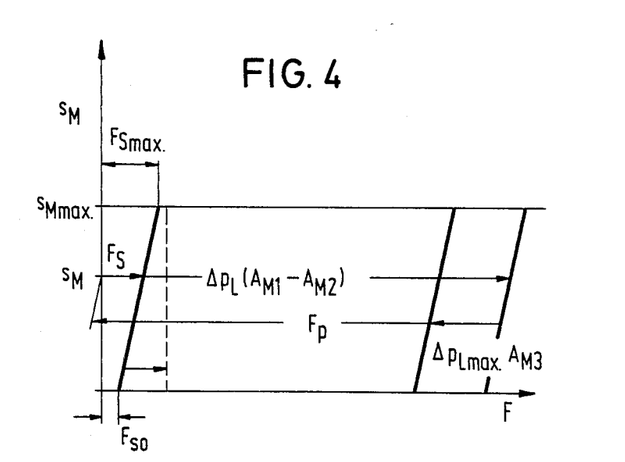
FIG. 4 is a diagram illustrating the force vs. travel characteristic curve of the vacuum servo drive.

The design conditions of the servo drive 20 are shown in FIG. 4, taking into consideration the different design-specific lost areas. The dependent variable is the stroke $s_M$ of the movable wall 34 separating the chambers M1, M2 from each other. Under conditions of equilibrium the following applies:

$$F_p = \Delta p_L(A_{M1} - A_{M2}) + F_s - \Delta p_{Lmax} A_{M3}$$

$$F_p = 0 \text{ for } \Delta p_L = 0 \text{ if}$$

$$A_3 = F_s / \Delta p_{Lmax}$$

$$\Delta p_L = p_{M2} - p_{M1}$$

From these conditions of equilibrium it becomes apparent that with the described set-up of the vacuum servo drive, a certain differential pressure is required in order to achieve the initial position in each case; particularly when the braking operation is interrupted abruptly during the brake slip control operation by releasing the brake pedal. Thereby, the air pressure in the ventilatable working chamber B2 of the vacuum brake power booster 32 decreases, and it it necessary to maintain and/or generate a certain air pressure at the elastic wall 34 by opening the auxiliary valve V7 when the valve V5 is closed.

Figure 7:
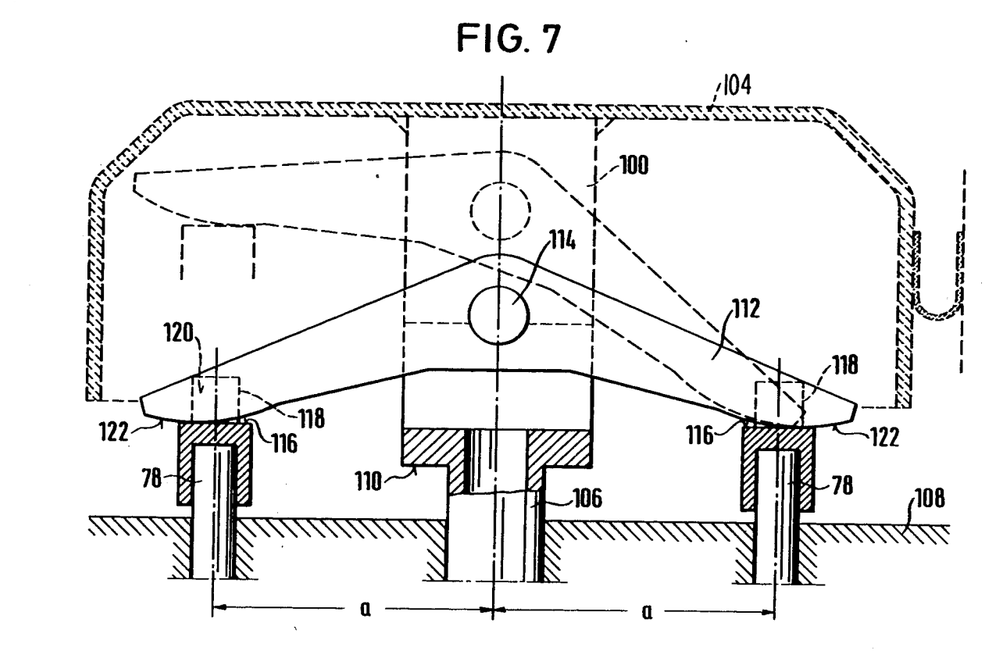
FIG. 7 is in a diagrammatic sectional view a differential gear with an angular lever which distributes the hold-down force of the vacuum servo drive onto the two plunger pistons of the pressure modulators.

FIG. 7 shows a differential gear through the intermediary of which the actuating force of the servo drive 20 is transmitted onto both plunger pistons 78 of the pressure modulators 16, 18 having a twin arrangement. The rod 100 connected with the movable wall 34 is longitudinally guided in parallel to the plunger pistons 78 and/or connected with a corresponding linear guiding element 106 which is able to ride in the housing 108 containing the plunger cylinders 86. The entering movement of the linear guiding element 106 into the housing 108 is limited by means of a stop surface 110. The linear guiding element 106 is arranged centrally between the plunger pistons 78, on a common level.

Articulated to the rod 100 or to the linear guiding element 106 is an angular lever 112 that acts upon the plunger pistons 78 with lever arms of equal lengths. The angular lever 112 pivots about an axis 114 extending transverse to the direction of movement of the rod 100. The ends of the plunger pistons 78 protrude from the housing 108. In the embodiment of FIG. 7, they are shaped in the form of flat tappets with a face level serving as a running surface 116. Guiding elements 118 which extend outwardly from this running surface 116 are provided and have two planar guiding surfaces situated opposite each other and receiving the angular lever 112 between them in a U-shaped configuration.

Each of the ends of the angular lever 112 is provided with a roll-off curve 122 which is in contact with the respective running surface 116 of the plunger piston. The running surface is on the end face of each plunger 78. The roll-off curve 122 is designed such that in any pivoting position of the angular lever 112, the contact with the plunger piston 78 is always made in the latter's axial center and with a horizontal tangent. Therefore, the effective lever arms of the plunger pistons 78 remain constant, irrespective of the angular position of the angular lever 112. The pressure in both plunger cylinders 86 is thus also constant and the pressure ratios are thus equivalent to those of a tandem plunger cylinder arrangement.

Figure 9:
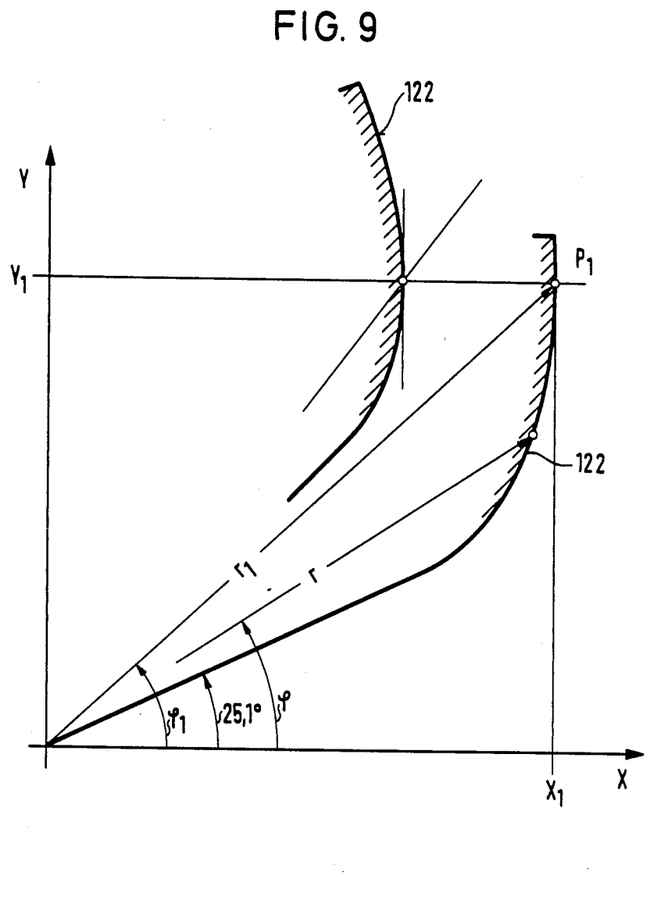
FIG. 9 shows a roll-off curve shaped at the ends of the angular lever.

FIG. 9 shows roll-off curves 122 which meet the above-mentioned requirement. They are involutes to a circle according to the equation $$= \arcsin \frac{y_1}{r} - \frac{1}{y_1}(x_1 - \sqrt{r^2 - y_1^2})$$

Figure 8:
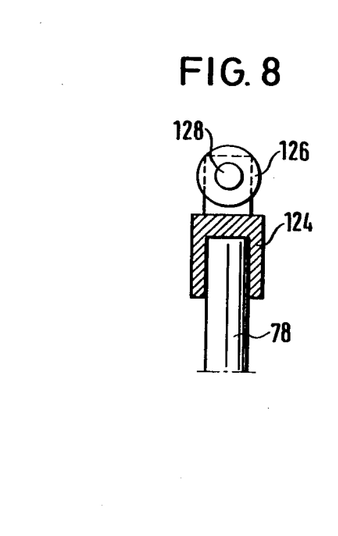
FIG. 8 is a diagrammatic sectional view of a modified form of the end of a plunger piston.

Due to the shape of the roll-off curves 122, the transverse forces acting upon the plunger pistons 78 are limited to the frictional forces on the contact level. These frictional forces are already low when flat tappets are used at the ends of the plunger pistons 78, but they can be further reduced by using roller tappets 124 as shown in FIG. 8 where a corresponding embodiment with a roller 126 is arranged in front of the end face of the plunger piston 78. The axis 128 of the roller 126 extends parallel to the axis 114 of the angular lever 112. The roller 126 runs along the roll-off curve 122 of the angular lever 112 and can be accommodated between guiding surfaces similar to the guiding surfaces 120 shown in FIG. 7. These guiding surfaces 120 constitute a safeguard against rotation of the movable wall 34 of the servo drive 20, illustrated as a vacuum plate in FIG. 7, and for the lever mechanism connected therewith.

As apparent from the broken lines shown in the illustration in FIG. 7, the angular lever 112 has been designed such that the maximum permissible relative movement of the plunger pistons 78 against each other equals exactly the total plunger stroke. The corresponding design requirement can be taken from the drawing with simple geometric considerations. The linear guiding element 106 has the function of a longitudinal guide of the lever mechanism. It should be mentioned that a vacuum servo drive 20 is not imperative for the linear guiding element 106. It is also possible that an electromechanical actuating device, for instance a ball spindle friction coupling mechanism, can act upon the bearing of the angular lever 112, all other drive characteristics remaining the same. In this case, a conventionally designed safety spring, i.e. a spring which holds the plunger pistons down before the brake slip control sets in, even at a maximum hydraulic pressure, should be provided.

The vacuum servo drive 20 described above is only operative when a vacuum pressure is prevailing since the weak spring 102 alone is unable to hold down the plunger pistons 78 in opposition to the hydraulic force $F_p$ acting upon them. In order to make sure that the plunger pistons 78 remain in their initial position, even in the event of a failure of the vacuum supply, a locking device is inventively provided which acts upon the linear guiding element 106. The locking device which is only outlined schematically in FIG. 1 has the shape of a vacuum-released and spring-actuated brake which is connected with a separate, spring-loaded vacuum air cylinder and which is actuated via the valve V8. If a vacuum pressure exists, the brake releases the linear guiding element 106. If, however, the vacuum pressure drops, the linear guiding element 106 is blocked with the result that the plunger pistons 78 are locked in their initial position and can no longer perform axial movements.

The connection of the vacuum servo drive 20 can be simplified such that its ventilatable chamber M2 is directly connected with the atmosphere and not with the ventilatable working chamber B2 of the vacuum brake power booster 32. The differential air pressure in the chambers M1, M2 would then always be sufficient to maintain the plunger pistons 78 in the initial position. The access to the controlled air pressure in the vacuum brake power booster 32 has, however, the advantage that the chamber M2 must not be evacuated of atmospheric pressure but of an always considerably lower pressure when the brake slip control sets in. This is connected with a saving of control time which is of particular importance in the case of a multiplex operation.

The use of a vacuum servo drive comprising a conventionally designed safety spring which generates the actuating force required to hold down the plunger pistons 78 substantially by itself, is also within the scope of the present invention. This variation wherein the force is mainly generated by the actuating force of the vacuum servo drive, has the advantage of a considerable reduction of the spring 102 and of space and weight savings connected therewith.

Figure 10:
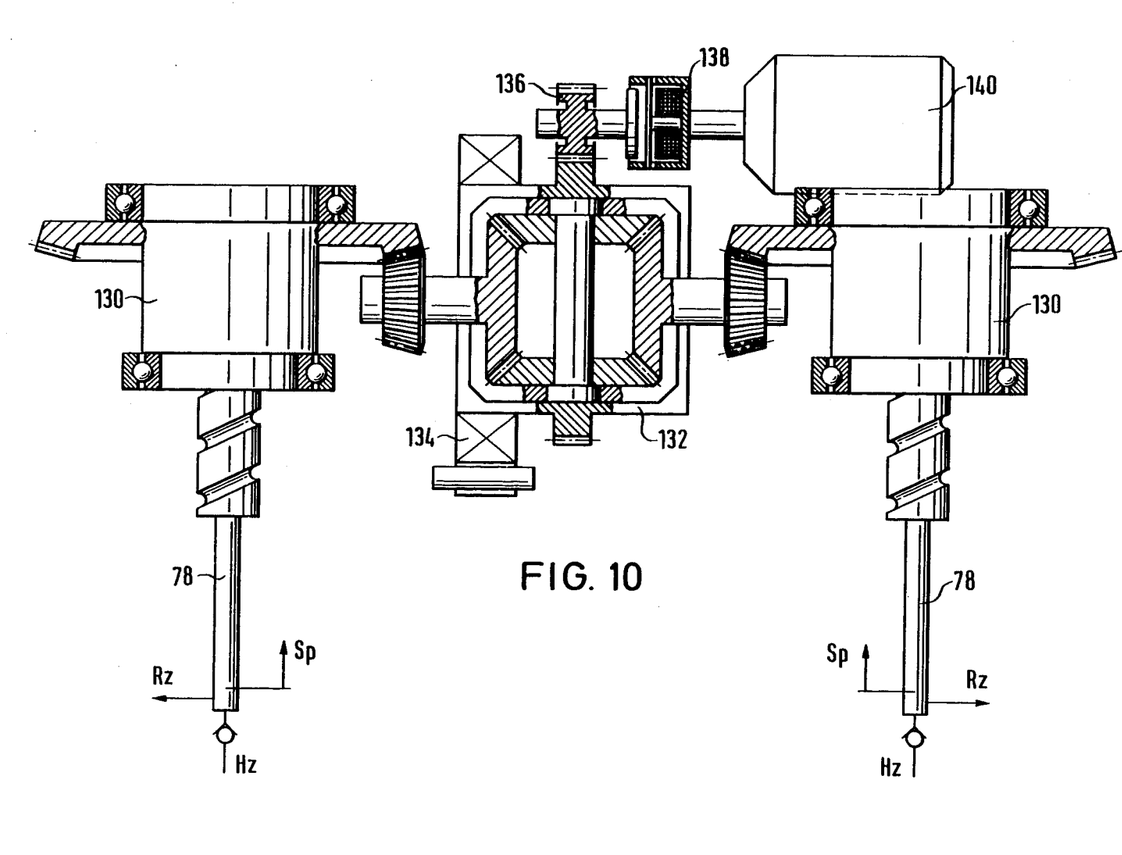
FIG. 10 shows a modified form of the invention using an electromotive drive for the pressure modulators via a differential gear.

FIG. 10 shows another drive variant for pressure modulators 16, 18 having a twin arrangement. In this case, the plunger pistons 78 are connected with a ball spindle drive 130 each in order to achieve a longitudinal displacement. A differential gear 132 including a safety spring 134 shaped in the form of a spiral spring is interposed between the ball spindle drives 130. The differential gear 132 is connected via a back gear 136 and an electromagnetically switched clutch 138 with an electric motor 140 serving as a drive system.

The reduction of the hydraulic pressure in the plunger cylinders 86 is effected such that the electric motor 140 moves the plunger pistons 78 in opposition to the torque of the safety spring 134, in the direction $S_p$, by means of the ball spindle drives 130. Thereby, the differential gear 132 ensures that both ball spindles are driven with the same torque. This requires, on the other hand, a pressure equilibrium in both plunger cylinders, not to mention the friction forces having differing effects. The renewed brake pressure build up is effected by the safety spring 134 alone because the clutch 138 is then open.

What is claimed is:

1. Brake slip-controlled dual circuit vehicle brake system comprising a master cylinder for receiving a brake pedal force and a plurality of independently controlled pressure fluid conduits for transmitting braking fluid to wheel brake cylinders, two pressure modulators, one of said pressure modulators being associated with one of the brake circuits, sensors for detecting a wheel lock and for generating control signals operative to control the pressure modulators to influence the brake pressure at the wheel brake cylinders, the pressure modulators being accommodated in a housing in a tandem arrangement, said pressure modulators being actuatable by means of a common drive unit, wherein the pressure modulators are provided with a hydraulic slave cylinder, each hydraulic slave cylinder having a connection leading to the master cylinder and a connection leading to at least one wheel brake cylinder, a valve is arranged between the connections, said valve being actuatable by means of a plunger piston arranged in the slave cylinder and controlled through the intermediary of the drive unit, wherein the drive unit includes a differential gear for acting upon the plunger pistons, wherein the differential gear comprises an angular lever and a driven linear guiding element, said lever being articulated to the guiding element, said lever having ends bearing against the end face of the two plunger pistons, and wherein the ends of the angular lever are formed with a roll-off curve so that in all angular positions of the lever, the contact between the roll-off curve and the plunger pistons is made in the lever's axial center and with a tangent which is directed transversely to the axial direction.

2. Dual circuit vehicle brake system according to claim 1 wherein the end of each plunger piston is provided with a roller running along its associated roll-off curve.

3. Brake slip-controlled dual circuit vehicle brake system comprising a master cylinder for receiving a brake pedal force and a plurality of independently controlled pressure fluid conduits for transmitting braking fluid to wheel brake cylinders, two pressure modulators, one of said pressure modulators being associated with one of the brake circuits, sensors for detecting a wheel lock and for generating control signals operative to control the pressure modulators to influence the brake pressure at the wheel brake cylinders, the pressure modulators being accommodated in a housing in a tandem arrangement, said pressure modulators being actuatable by means of a common drive unit, wherein the pressure modulators are provided with a hydraulic slave cylinder, each hydraulic slave cylinder having a connection leading to the master cylinder and a connection leading to at least one wheel brake cylinder, a valve is arranged between the connections, said valve being actuatable by means of a plunger piston arranged in the slave cylinder and controlled through the intermediary of the drive unit, wherein the drive unit includes a differential gear for acting upon the plunger pistons, and wherein the differential gear comprises a linear guiding element and an electromagnetically actuatable ball spindle friction coupling mechanism.

4. Brake slip-controlled dual circuit vehicle brake system comprising a master cylinder for receiving a brake pedal force and a plurality of independently controlled pressure fluid conduits for transmitting braking fluid to wheel brake cylinders, two pressure modulators, one of said pressure modulators being associated with one of the brake circuits, sensors for detecting a wheel lock and for generating control signals operative to control the pressure modulators to influence the brake pressure at the wheel brake cylinders, the pressure modulators being accommodated in a housing in a tandem arrangement, said pressure modulators being actuatable by means of a common drive unit, wherein the pressure modulators are provided with a hydraulic slave cylinder, each hydraulic slave cylinder having a connection leading to the master cylinder and a connection leading to at least one wheel brake cylinder, a valve is arranged between the connections, said valve being actuatable by means of a plunger piston arranged in the slave cylinder and controlled through the intermediary of the drive unit, wherein the drive unit includes a differential gear for acting upon the plunger pistons, wherein the differential gear comprises an angular lever and a driven linear guiding element, said lever being articulated to the guiding element, said lever having ends bearing against the end face of the two plunger pistons, wherein the linear guiding element is actuatable by means of a vacuum servo drive, said vacuum servo drive comprising two chambers separated from each other by means of a movable wall, said movable wall being connected with the linear guiding element, one chamber being permanently under a vacuum, the other chamber being selectively connected to a vacuum or to air pressure so as to generate an actuating force at the plunger pistons which acts in opposition to a hydraulic force ($F_p$) applied to the plunger pistons, and wherein the vacuum servo drive includes a spring which bears against the movable wall and which acts in opposition to the hydraulic force ($F_p$) at the plunger pistons, and wherein the spring exerts a relatively weak force and the actuating force is primarily applied pneumatically by means of air injection into the ventilatable chamber of the vacuum servo drive, the sum of pneumatic actuating force $F_N$ and spring actuating force $F_S$ exceeding the hydraulic force $F_P$ at the plunger pistons before brake slip control sets in.

5. Brake slip-controlled dual circuit vehicle brake system comprising a master cylinder for receiving a brake pedal force and a plurality of independently controlled pressure fluid conduits for transmitting braking fluid to wheel brake cylinders, two pressure modulators, one of said pressure modulators being associated with one of the brake circuits, sensors for detecting a wheel lock and for generating control signals operative to control the pressure modulators to influence the brake pressure at the wheel brake cylinders, the pressure modulators being accommodated in a housing in a tandem arrangement, said pressure modulators being actuatable by means of a common drive unit, wherein the pressure modulators are provided with a hydraulic slave cylinder, each hydraulic slave cylinder having a connection leading to the master cylinder and a connection leading to at least one wheel brake cylinder, a valve is arranged between the connections, said valve being actuatable by means of a plunger piston arranged in the slave cylinder and controlled through the intermediary of the drive unit, wherein the drive unit includes a differential gear for acting upon the plunger pistons, wherein the differential gear comprises an angular lever and a driven linear guiding element, said lever being articulated to the guiding element, said lever having ends bearing against the end face of the two plunger pistons, wherein the linear guiding element is actuatable by means of a vacuum servo drive, said vacuum servo drive comprising two chambers separated from each other by means of a movable wall, said movable wall being connected with the linear guiding element, one chamber being permanently under a vacuum, the other chamber being selectively connected to a vacuum or to air pressure so as to generate an actuating force at the plunger pistons which acts in opposition to a hydraulic force ($F_p$) applied to the plunger pistons, and wherein the vacuum servo drive includes a vacuum servo drive brake which is released when a vacuum exists and becomes operative in the event of a vacuum drop, and which locks the linear guiding element.

6. Brake slip-controlled dual circuit vehicle brake system comprising a master cylinder for receiving a brake pedal force and a plurality of independently controlled pressure fluid conduits for transmitting braking fluid to wheel brake cylinders, two pressure modulators, one of said pressure modulators being associated with one of the brake circuits, sensors for detecting a wheel lock and for generating control signals operative to control the pressure modulators to influence the brake pressure at the wheel brake cylinders, the pressure modulators being accommodated in a housing in a tandem arrangement, said pressure modulators being actuatable by means of a common drive unit, wherein the pressure modulators are provided with a hydraulic slave cylinder, each hydraulic slave cylinder having a connection leading to the master cylinder and a connection leading to at least one wheel brake cylinder, a valve is arranged between the connections, said valve being actuatable by means of a plunger piston arranged in the slave cylinder and controlled through the intermediary of the drive unit, wherein the drive unit includes a differential gear for acting upon the plunger pistons, and wherein the drive unit is an electric motor and wherein a differential gear is interposed as a compensating gear between two plunger piston drives.

* * * * *